United States Patent
Castellano et al.

[11] Patent Number: 6,130,612
[45] Date of Patent: Oct. 10, 2000

[54] ANTENNA FOR RF TAG WITH A MAGNETOELASTIC RESONANT CORE

[75] Inventors: Anthony Castellano, Hopewell Junction; Harley Kent Heinrich, Brewster; Alejandro Gabriel Schrott; Robert Jacob Von Gutfeld, both of New York, all of N.Y.

[73] Assignee: Intermec IP Corp., Woodland Hills, Calif.

[21] Appl. No.: 09/309,330

[22] Filed: May 11, 1999

Related U.S. Application Data

[63] Continuation-in-part of application No. 09/225,431, Jan. 5, 1999.
[60] Provisional application No. 60/070,406, Jan. 5, 1997.
[51] Int. Cl.[7] .................................................. G08B 13/14
[52] U.S. Cl. ................................ 340/572.6; 340/572.2; 340/572.7
[58] Field of Search ........................... 340/571, 572.1, 340/572.2, 572.4, 572.6, 572.7, 572.8, 551, 552, 825.54; 343/787, 788, 866, 867

[56] References Cited

U.S. PATENT DOCUMENTS

| | | | |
|---|---|---|---|
| 4,413,254 | 11/1983 | Pinneo et al. | 340/572.7 |
| 4,510,490 | 4/1985 | Anderson, III et al. | 340/572.7 |
| 4,864,281 | 9/1989 | Fearon et al. | 340/572.7 |
| 5,051,726 | 9/1991 | Copeland et al. | 340/572.7 |
| 5,448,110 | 9/1995 | Tuttle et al. | 340/285.54 |
| 5,552,778 | 9/1996 | Schrott et al. | 340/551 |
| 5,602,527 | 2/1997 | Suenaga | 340/551 |
| 5,923,300 | 7/1999 | Mejia | 340/825.54 |

*Primary Examiner*—Benjamin C. Lee
*Assistant Examiner*—Van T. Trieu
*Attorney, Agent, or Firm*—O'Melveny & Myers LLP

[57] ABSTRACT

A radio frequency identification transponder (RFID tag) includes an RFID antenna and one or more elements of nonlinear magnetic material tuned to resonate at substantially the same frequency as the resonant frequency of the tag antenna. This co-resonance amplifies signals that impinge upon the antenna, yielding both a higher level signal from the antenna to the tag electronics and wider operational bandwidth for the tag. With the addition of the nonlinear magnetic material, the tag may also be employed as a magnetic surveillance tag, with the attendant non-screening capabilities. With a plurality of nonlinear magnetic elements tuned to different resonant frequencies, the tag may provide more "non-screenable" information, that is, two bits, or four binary states, for example, when two such elements are employed.

21 Claims, 1 Drawing Sheet

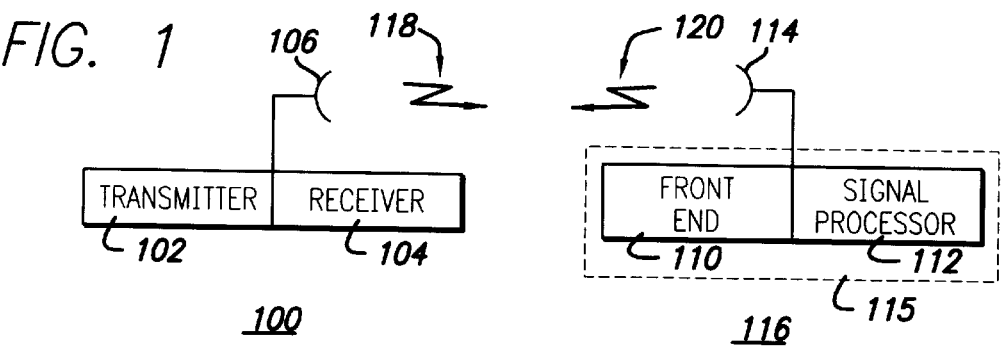
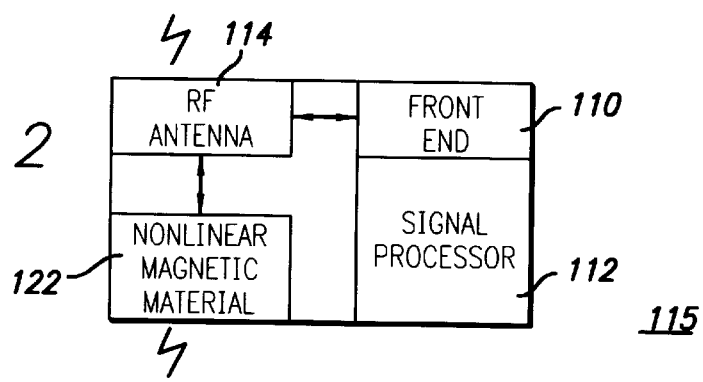
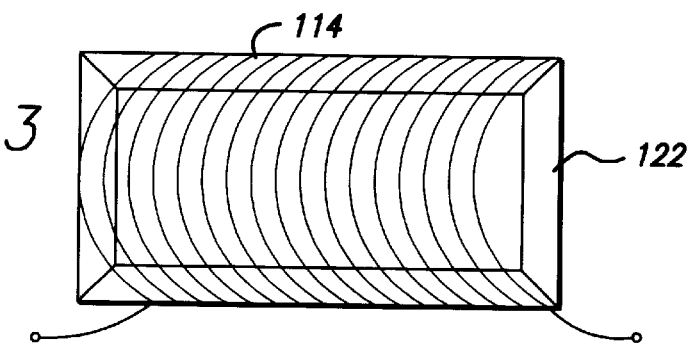
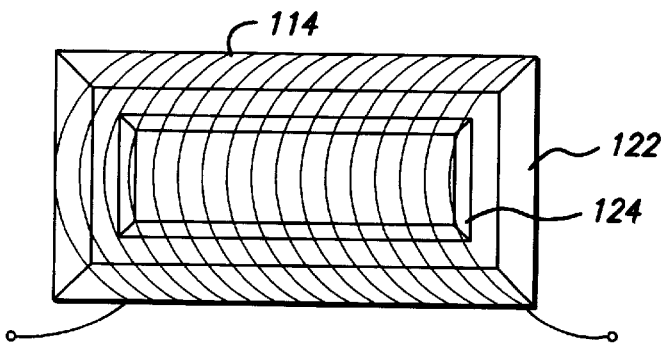
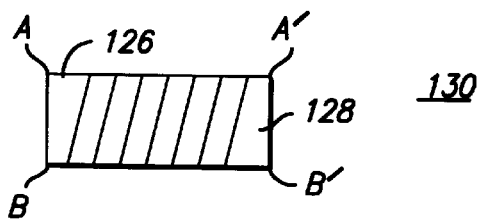

ANTENNA FOR RF TAG WITH A MAGNETOELASTIC RESONANT CORE

CROSS-REFERENCE TO RELATED APPLICATIONS

The present application is a continuation-in part of application Ser. No. 09/225,431 filed Jan. 5, 1999, which claims the benefit of U.S. Provisional Application No. 60/070,406 filed Jan. 5, 1997 being specifically incorporated herein, in their entireties, by reference.

FIELD OF THE INVENTION

The invention relates to radio frequency transponders, and, more particularly, to apparatus and method for improving the range of such transponders.

BACKGROUND OF THE INVENTION

Radio Frequency Identification (RFID) transponders (tags) are operated in conjunction with RFID base stations for a variety of inventory-control, security and other purposes. Typically an item having a tag associated with it, for example, a container with a tag placed inside it, is brought into a "read zone" established by the base station. The RFID base station generates a continuous wave electromagnetic disturbance at a carrier frequency. This disturbance is modulated to correspond to data that is to be communicated via the disturbance. The modulated disturbance, which carries information and may be referred to as a signal, communicates this information at a rate, referred to as the data rate, which is lower than the carrier frequency. The transmitted disturbance will be referred to hereinafter as a signal or field. The RFID base station transmits an interrogating RF signal which is modulated by a receiving tag in order to impart information stored within the tag to the signal. The receiving tag then transmits the modulated, answering, RF signal to the base station.

RFID tags may be active, containing their own RF transmitter, or passive, having no transmitter. Passive tags, i.e., tags that rely upon modulated back-scattering to provide a return link to an interrogating base station, may include their own power sources, such as a batteries, or they may be "field-powered", whereby they obtain their operating power by rectifying an interrogating RF signal that is transmitted by a base station. Although both types of tag have minimum RF field strength read requirements, or read thresholds, in general, a field-powered passive system requires at least an order of magnitude more power in the interrogating signal than a system that employs tags having their own power sources. Because the interrogating signal must provide power to a field-powered passive tag, the read threshold for a field-powered passive tag is typically substantially higher than for an active tag. However, because field-powered passive tags do not include their own power source, they may be substantially less expensive than active tags and because they have no battery to "run down", field-powered passive tags may be more reliable in the long term than active tags. And, finally, because they do not include a battery, field-powered passive tags are typically much more "environmentally-friendly."

Such RFID systems provide significant advantages over conventional identification systems, such as barcode identification systems, in the identification, tracking, and control of objects with which they are associated. RFID systems provide a rapid read rate, whereby a number of RFID transponders, or tags, may be rapidly read, outside the line-of-sight of and at some remove from, an interrogating base station. Additionally, unlike bar codes or other write-once, read-many information storage systems, some RFID tags provide the ability of updating the information stored within the tag.

In spite of these advantages, RFID systems do have their limitations. A, limited read distances preclude their use in applications in which it is impractical to bring a package with which a tag is associated into the base station's read range. For example, in order to accommodate bulky packages, an end-user may be required to provide a large tag-reading station, associated with the base station, or, if the package is too bulky or too heavy, it may prove impractical to move the package to a tag reading area. In any case, increasing a tag's read distance would enhance the operation of all applications in which read distance may be a system limitation. Additionally, since it is relatively easy to "shield" radio frequency signals, RFID tags are not particularly well suited to security applications. A tag which increases a conventional RFID tag's read distance and which circumvents the shielding of such tags, thereby improving their applicability to security applications, would therefore be highly desirable.

SUMMARY

A radio frequency identification transponder (RFID tag) in accordance with the principles of the present invention combines a tag antenna, nonlinear magnetic material, and RFID electronics in a manner whereby interaction between the antenna and the nonlinear magnetic material increases the signal presented by the antenna to the RFID tag electronics, and increases the bandwidth of the tag. The nonlinear magnetic material, which may be a material such as magnetoelastic material, is responsive to varying magnetic fields by emitting its own varying electromagnetic field. The frequency at which the material emits signals of greatest strength is the material's resonant frequency, which is related to geometrical properties of the material and to the speed of sound in the material. The tag antenna may also be characterized by a resonant frequency, at which frequency the antenna yields a maximum output signal to the tag electronics for a given input signal level intercepted by the antenna. In accordance with the principles of the invention, the antenna and magnetic material are designed so that the antenna's resonant frequency and the resonant frequency of the nonlinear magnetic material substantially coincide. This coincidence of resonant frequencies substantially increases both the peak signal output from the antenna and the bandwidth of signals yielding a given signal level at the output of the antenna. As a result, an RFID tag employing the new antenna combination may operate with both an improved range and a wider bandwidth than tags employing conventional antennas. Additionally, the combination tag may employ the responsiveness of the nonlinear magnetic material to operate as a magnetic security tag.

In an illustrative embodiment the tag RFID antenna is formed as a coil wrapped around a nonlinear magnetic material core and, in accordance with the principles of the present invention, the resonant frequencies of the antenna and of the magnetic core are substantially the same. The antenna permits the tag to operate as an RFID tag and the nonlinear magnetic core, which may be composed of magnetoelastic material, permits the tag to operate as a magnetic surveillance device. The antenna may be combined with a plurality of nonlinear magnetic cores to produce a plurality of resonances, thereby enhancing the operation of the tag at a plurality of frequencies.

Because tags which employ nonlinear magnetic materials having a first, or fundamental, resonance in the range of 20–120 kHz may be readily produced, the new tags are particularly well suited for operation in this range of frequencies. Additionally, the new tag is particularly well suited to application in RFID systems which combine relatively high volume data storage, such as available from RFID tags, with the security/surveillance function afforded by nonlinear magnetic tags. By employing nonlinear magnetic materials that have different resonant frequencies, but which frequencies nevertheless substantially coincide with the resonant frequency of the RFID tag, the system may operate at a plurality of resonant frequencies.

BRIEF DESCRIPTION OF THE DRAWINGS

The above and further features, aspects, and advantages of the invention will be apparent to those skilled in the art from the following detailed description, taken together with the accompanying drawings in which:

FIG. 1 is a conceptual block diagram of a radio frequency identification system in accordance with the principles of the present invention, FIG. 2 is a conceptual block diagram of a new RFID tag in accordance with the principles of the present invention FIG. 3 is a perspective view of a coil/core combination that may be employed in an RFID tag in accordance with the principles of the present invention FIG. 4 is a perspective view of a coil/multi-core combination that may be employed in an tag in accordance with the principles of the present invention; and FIG. 5 is a top plan view of a coil formed using a flexible substrate and printed circuit techniques which may be employed with a core in an RFID tag in accordance with the principles of the present invention.

DETAILED DESCRIPTION

A radio frequency identification transponder (RFID tag) in accordance with the principles of the present invention combines a tag antenna, one or more elements of nonlinear magnetic material, and RFID electronics. The nonlinear magnetic material and antenna are situated to interact in a manner whereby the antenna's output signal to the tag electronics is increased in magnitude relative to the antenna's response without the nonlinear magnetic material. Additionally, the bandwidth of the RFID tag is increased, and the nonlinear magnetic material may also be employed as a magnetic surveillance article. An RFID tag which incorporates the functionality of RFID tags and magnetic surveillance tags is disclosed in U.S. patent application Ser. 09/071,413, filed May 1, 1998, which is hereby incorporated by reference in its entirety.

An RFID system in accordance with the principles of the present invention is illustrated in the conceptual block diagram of FIG. 1. An RF base station 100 includes an RF transmitter 102, an RF receiver 104, and an antenna 106 connected to the transmitter 102 and receiver 104. An RF tag 116 such as may be used in conjunction with the base station 100 includes an RF front end 110, a signal processing section 112, and an antenna 114 which receives electromagnetic signals transmitted from the base station and passes the signals along to RFID tag electronics which comprise the RF front end 110 and signal processing section 112.

In operation, the base station 100 interrogates the tag 116 by generating an RF signal having a carrier frequency $F_c$. The carrier frequency $F_c$ is chosen based on a number of factors known in the art, including the amount of power permitted at that frequency by FCC regulations. The RF signal is coupled to the antenna 106 and transmitted to the tag 116. The tag 116 may be employed in any of a number of inventory control or tracking applications. In accordance with the principles of the invention, the tag 116 includes at least one element of nonlinear magnetic material that is situated to interact with the antenna to amplify signals received by the antenna. Additionally, the nonlinear magnetic material permits the tag to operate as a magnetic surveillance tag in conjunction with a magnetic surveillance interface 117 which may be integrated with the base station 100. The magnetic surveillance interface 117 may be used to interrogate a tag 116, in a manner that is not readily shielded by, for example, enclosing the tag 116 in a conductive material.

The RF signal emitted by the antenna 106, will, ostensibly, be received by the tag antenna 114 and, if the RF signal's field strength meets a read threshold requirement, the RF tag will respond to the reception of the signal by modulating the RF carrier to impart information about the associated container onto the back-scattered RF field, which propagates to the base station 100. The RF signal transmitted by the base station 100 must have sufficient field strength, taking into account the polarization of the signal and of the tag's antenna, at the location of the tag 116 for the tag to detect the RF signal. In the case of a field-powered passive tag, the interrogating signal's field strength generally must be great enough for the tag 116 to rectify the signal and to use the signal's energy for the tag's power source. The amplifying action of the nonlinear magnetic material lowers the RF signal's field strength threshold requirement.

In the conceptual block diagram of FIG. 2, the new RFID tag 116 includes an antenna that is coupled to RFID tag electronics in the form of an RFID tag front end 110. The tag front end 110, in turn, is coupled to additional RFID tag electronics in the form of signal processing electronics 112. The signal processing electronics 112 may include a variety of electronic circuits which may perform functions, in addition to signal processing, such as the storage and retrieval of tag-related data, for example. As is known in the art, this data may be stored in a memory circuit, such as non-volatile RAM or EEPROM, for example. The tag also includes nonlinear magnetic material 122 which is situated to couple with the antenna 114 in such a manner as to amplify signals received by the antenna 114 and presented to the RF front end 110 in a manner discussed in greater detail in relation to FIGS. 3 and 4 below. In accordance with the principles of the present invention, the nonlinear magnetic material 122, which may be a strip of magnetoelastic foil such as Magnetic Alloy 2826MB available from Allied Signal, METGLAS products 6 Eastman Road, Parsippeny N.J. 07054, in addition to its role in amplifying signals received by the antenna 114, may be employed as a magnetic surveillance device. Magnetic surveillance devices are known and employed, for example, in retail outlets to prevent theft. The bias state of the material 122 is typically read, to determine, for example, whether an article to which the material 122 is attached has been purchased as the article exits a retail outlet.

The perspective view of FIG. 3 illustrates a combination of an RFID tag antenna 114 and a element of magnetoelastic material 122 in the form of a strip of magnetoelastic foil in accordance with the principles of the present invention. In this illustrative embodiment, the magnetoelastic strip 122 forms the core of a spiral antenna 114. As in a conventional RF tag, the antenna circuit may be tuned by adjusting the capacitance and inductance of the spiral, or coil antenna 114 so that the antenna resonates at the carrier frequency Fc employed by the base station 100. The addition of the magnetoelastic material as a core, which modifies the permeability of the coil's interior, changes the inductance of the antenna and, consequently, shifts the resonant frequency of the antenna. That is, the combination of the coil antenna 114 and the magnetoelastic core 122 has a different resonant frequency than that of the coil antenna114 alone. The magnetoelastic core 122 may also be characterized by a separate, magnetoelastic resonant frequency, and, in accordance with the principles of the invention, the coil 114 and core 122 are tuned so that their resonant frequencies are substantially the same. As is known in the art, the magnetoelastic core 122 is typically biased with a permanent magnet (not shown), as in, for example, a commercially available Ultra-Max™ available from Sensormatic corporation.

This task of matching resonant frequencies is eased somewhat by the observed fact that the magnetoelastic resonance may be experienced over a relatively wide range of frequencies. For example, a core 122 that is four centimeters long, one centimeter wide, and 0.0025 centimeters thick resonates at 58 kHz, with full width half maximum (FWHM) of 400 Hz. Without the magnetoelastic core, a coil of 250 turns exhibiting a capacitance of 4500 picofarads; the resonant frequency of the coil is 130 kHz, with a FWHM of 16 kHz.

Placing the 122 inside the coil 114 would normally yield a plurality of peak resonant frequencies for the coil/core combination. That is, placing the core 122 inside a similar coil, characterized by a capacitance of 1000 picofarads rather than 4500, has relatively little effect on the location of coil's resonant frequency; a resonant frequency which will be referred to as the coil resonant frequency. Additionally, the core/coil combination exhibits another resonance having a FWHM substantially equal to that of the core alone, located near the resonant frequency of the magnetoelastic element 122; a resonant frequency which will be referred to as the core resonant frequency. Although the location of the coil's resonant frequency is not shifted substantially due to the addition of the core 122, the permeability of the core leads to a fourfold amplification of the output signal at the coil resonant frequency. At the same time, the FWHM of the coil 114 is only marginally diminished by the addition of the core 122.

In accordance with the principles of the invention, the coil and core resonant frequencies may be brought close to coincidence so that the output signal from the coil/core combination at the "combined" resonant frequency is substantially higher than without the core, or, even, than that obtained at the "first", or coil resonant frequency. For example, if the coiled is retuned with a higher capacitance, say 3,300 picofarads, the coil resonance shifts down toward the resonant frequency of the magnetoelastic element, to approximately 80 kHz, yielding an output signal that is approximately double the value obtained at 130 kHz and, consequently, eight times the value obtained by the coil alone. At this point, the FWHM is approximately half its previous value. The coil may be further tuned by increasing the capacitance of the coil just discussed until the "coil" and "core" resonant frequencies are minimally separated, or substantially equal. The output signal from the coil/core combination at this "combination" resonant frequency is ten times that of the coil without the magnetoelastic core. The FWHM of this resonance is approximately one fourth the value exhibited by the coil alone. Although the resonant frequencies are brought as close together as possible, a second resonant frequency, the foil resonance, remains, and the peak output signal at this frequency is approximately three times its value without the coil, and its FWHM is an order of magnitude greater.

As illustrated in the perspective view of FIG. 4, a plurality of magnetoelastic elements may be employed as coil antenna cores in accordance with the principles of he present invention. In the antenna/core combination of FIG. 4 a coil 114 envelops magnetoelastic elements 122 and 124 of different lengths. Since the magnetoelastic resonant frequency of such an element is proportional to the speed of sound divided by the length of the element, the elements' lengths may be chosen to establish their resonant frequencies. With the appropriate biasing, applied to the elements 122 and 124, a plurality of "combination" resonances may be produced with elements of slightly different lengths, permitting efficient operation of at tag 116 across a relatively wide band of frequencies. Alternatively a plurality of elements having closely matched lengths may be employed to further enhance the amplitude of the output signals at resonance. That is, this "coincidence" of resonant frequencies substantially increases both the peak signal output from the antenna and the bandwidth of signals yielding a given signal level at the output of the antenna. As a result, an RFID tag employing the new antenna combination may operate with both an improved range and a wider bandwidth than tags employing conventional antennas. Additionally, the combination tag may employ the responsiveness of the nonlinear magnetic material to operate as a magnetic security tag.

Because tags which employ nonlinear magnetic materials having a first, or fundamental, resonance in the range of 20–120 kHz may be readily produced, the new tags are particularly well suited for operation in this range of frequencies. A tag having a plurality of magnetoelastic elements may operate as a magnetic surveillance device at that lower resonant frequency, and at a higher frequency for the RFID function. Additionally, the new tag is particularly well suited to application in RFID systems which combine relatively high volume data storage, such as available from RFID tags, with the security/surveillance function afforded by nonlinear magnetic tags. By employing nonlinear magnetic materials that have different resonant frequencies, but which frequencies nevertheless substantially coincide with the resonant frequency of the RFID tag, the system may operate at a plurality of resonant frequencies.

In accordance with the principles of the invention, an RFID tag may employ a biased magnetoelastic core enveloped by a coil antenna 114, with the individual resonances tuned to be minimally separated, or substantially equal, so that an output signal received by the antenna is substantially greater than it would be without the core element 122. If the RFID tag is operated at a carrier frequency close to the magnetoelastic frequency, the input signal, and thus, the power provided to a field powered RFID tag, may be substantially increased, in comparison to that available in conventional tags. Additionally, the tag may advantageously operate as a magnetic surveillance tag at this frequency. A plurality of core elements may be employed to increase the amplitude of the resonance and, if the elements are slightly different in length, to produce additional resonances for advantageous operation.

As illustrated in the top plan view of FIG. 5 a low cost coil for enveloping the magnetoelastic elements in accordance with the principles of the present invention may be formed using conventional printed circuit techniques to print diagonal conductive traces 126 on a flexible dielectric substrate 128. After printing, the circuit 130 may be folded around a magnetoelastic element so that conductive points along the line A—A' meet conductive points along the line B—B' and the conductive points may be soldered, thus forming a coil around one or more magnetoelastic elements.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A radio frequency identification transponder (RFID tag) comprising:

RFID tag electronics, an antenna responsive to received radio frequency signals by producing an output signal to the RFID tag electronics, and at least one element of nonlinear magnetic material formed to amplify the output signal presented to the RFID tag electronics.

2. The RFID tag of claim 1, said RFID tag having an operational bandwidth, wherein the nonlinear magnetic material and antenna are coupled to increase the operational bandwidth of the tag.

3. The RFID tag of claim 1 wherein the nonlinear magnetic material is formed to resonate at substantially the same frequency as the antenna's resonant frequency.

4. The RFID tag of claim 1 wherein the tag includes a plurality of nonlinear material elements, each formed to resonate at substantially the same frequency as the antenna's resonant frequency.

5. The RFID tag of claim 1 wherein the nonlinear magnetic material is magnetoelastic material.

6. The RFID tag of claim 1 wherein the nonlinear magnetic material produces an electromagnetic signal suitable for use in magnetic surveillance in response to excitation by a sinusoidally varying magnetic field.

7. The RFID tag of claim 1 wherein the antenna is formed as coil wrapped around a nonlinear magnetic core.

8. The RFID tag of claim 7 weherein the nonlinear magnetic core is a foil of magnetoelastic material biased by magnetic biasing material.

9. The RFID tag of claim 7 wherein the antenna is formed as a coil wrapped around a plurality of nonlinear magnetic cores, each of which is tuned to have a different magnetoelastic resonant frequency, but each of which is substantially the same as the resonant frequency of the antenna.

10. The RFID tag of claim 7 wherein the antenna coil is formed as a printed circuit on flexible material which is flexed around the nonlinear magnetic core and connected to form a spiral antenna encompassing the nonlinear magnetic core.

11. A radio frequency identification system comprising:

a base station for communication with one or more RFID tags, a RFID tag, the RFID tag including:
      RFID tag electronics,
      an antenna responsive to received radio frequency signals by producing an output signal to the RFID tag electronics, and
      at least one element of nonlinear magnetic material formed to amplify the output signal presented to the RFID tag electronics.

12. The system of claim 11, said RFID tag having an operational bandwidth, wherein the nonlinear magnetic material and antenna are coupled to increase the operational bandwidth of the tag.

13. The system of claim 11 wherein the nonlinear magnetic material is formed to resonate at substantially the same frequency as the antenna's resonant frequency.

14. The system of claim 11 wherein the tag includes a plurality of nonlinear material elements, each formed to resonate at substantially the same frequency as the antenna's resonant frequency.

15. The system of claim 11 wherein the nonlinear magnetic material is magnetoelastic material.

16. The system of claim 11 wherein the biased nonlinear magnetic material produces an electromagnetic signal suitable for use in magnetic surveillance in response to excitation by a sinusoidally varying magnetic field.

17. The system of claim 11 wherein the antenna is formed as coil wrapped around a nonlinear magnetic core.

18. The system of claim 17 wherein the nonlinear magnetic core is a foil of magnetoelastic material biased by a magnetic bias element.

19. The system of claim 17 wherein the antenna is formed as a coil wrapped around a plurality of nonlinear magnetic cores, each of which is tuned to have a different magnetoelastic resonant frequency, but each of which is substantially the same as the resonant frequency of the antenna.

20. The system of claim 17 wherein the antenna coil is formed as a printed circuit on flexible material which is flexed around the nonlinear magnetic core and connected to form a spiral antenna encompassing the nonlinear magnetic core.

21. The system of claim 17 further comprising a magnetic surveillance monitor interface which is responsive to the bias state of the magnetoelastic element.

* * * * *